US005172895A

United States Patent [19]

Klimach

[11] Patent Number: 5,172,895

[45] Date of Patent: Dec. 22, 1992

[54] CLAMPING DEVICE

[75] Inventor: Horst Klimach, Ilsfeld-Auenstein, Fed. Rep. of Germany

[73] Assignee: Bessey & Sohn GmbH & Co., Bietigheim-Bissingen, Fed. Rep. of Germany

[21] Appl. No.: 466,460

[22] PCT Filed: Sep. 15, 1989

[86] PCT No.: PCT/EP89/01072

§ 371 Date: May 29, 1990

§ 102(e) Date: May 29, 1990

[87] PCT Pub. No.: WO90/02633

PCT Pub. Date: Mar. 22, 1990

[30] Foreign Application Priority Data

Sep. 15, 1988 [DE] Fed. Rep. of Germany ....... 3831375

[51] Int. Cl.[5] ............................................... B23Q 1/04

[52] U.S. Cl. ........................................ 269/41; 269/88; 269/261; 269/268; 269/283; 269/902; 269/253

[58] Field of Search ................................ 269/268-271, 269/41, 902, 901, 261, 88, 252, 279, 283

[56] References Cited

U.S. PATENT DOCUMENTS 4,139,189 2/1979 Wietrzyk ............................ 269/902
4,377,959 3/1983 De Carolis ........................... 269/41
4,527,786 7/1985 Hsu ..................................... 269/902
4,583,724 4/1986 Huang ................................. 269/88

FOREIGN PATENT DOCUMENTS 808455 7/1949 Fed. Rep. of Germany ...... 269/261
121888 6/1948 Sweden .............................. 269/268

*Primary Examiner*—Robert C. Watson
*Attorney, Agent, or Firm*—Barry R. Lipsitz

[57] ABSTRACT

A clamping device includes a first and a second clamping yoke (36, 38), which are mutually adjustable in a plane of movement. The first clamping yoke (36) carries two mounting jaws (82), each having a first angular clamping surface (86), which is arranged at an angle $\alpha_1 < 180°$ relative to the other first angular clamping surface and perpendicular to the plane of movement (58), so that the first angular clamping surfaces form a first prismatic workpiece receptable open towards a mounting jaw of the second clamping yoke. Said clamping device also includes a spindle (42), extending parallel to the plane of movement, for adjusting the position of the clamping yokes relative to each other. To improve said clamping device in such a manner that it can be adapted to a maximum of clamping operations of the type that are usually performed in workshops, an additional jaw (104) can be added on the first clamping yoke, having a flat clamping surface facing one of the mounting jaws of the second clamping yoke and closer to the latter than the first angular clamping surfaces.

38 Claims, 12 Drawing Sheets

CLAMPING DEVICE

Figure 1:
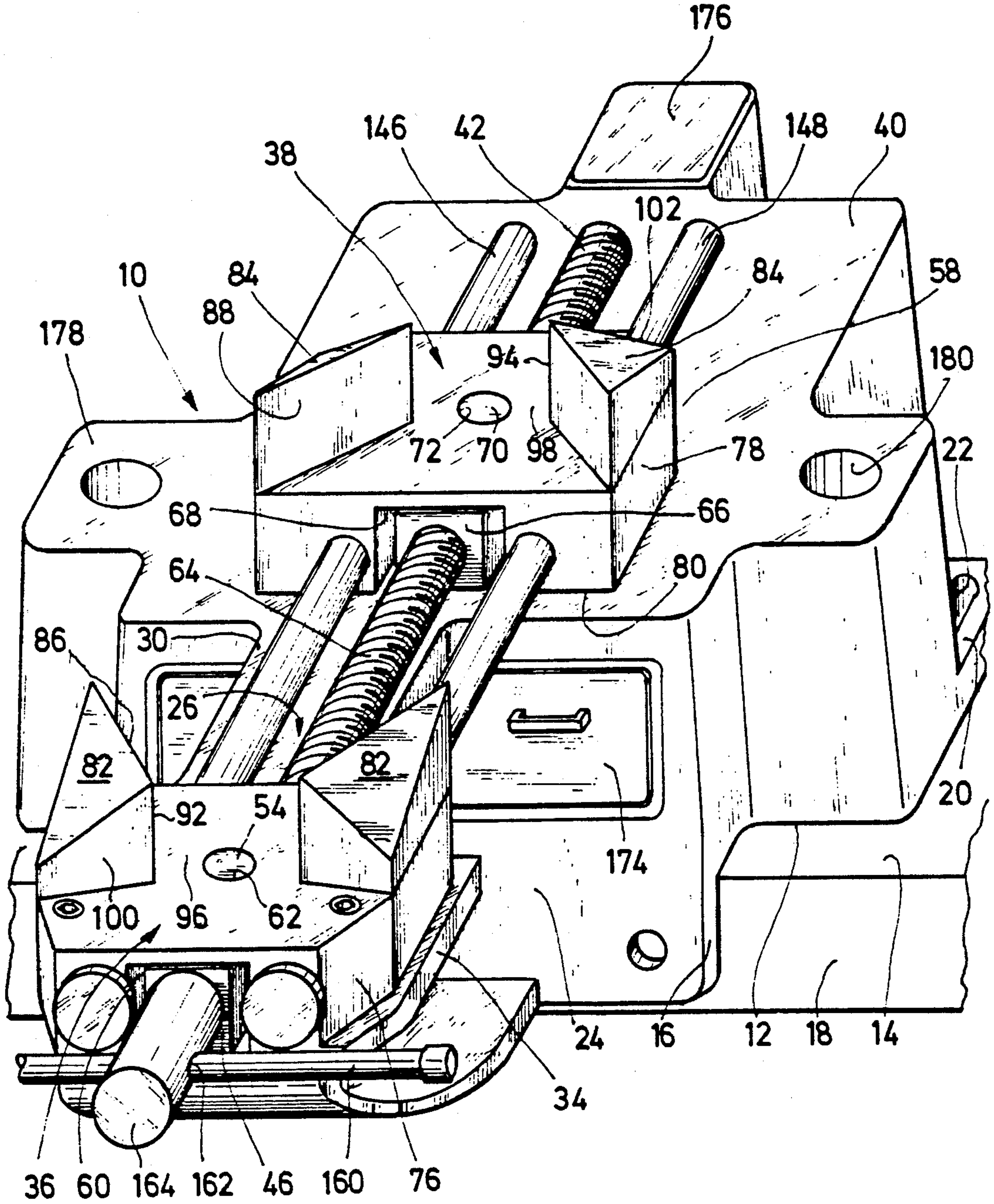

The invention relates to a clamping device comprising a first and a second clamping yoke adjustable relative to each other in a plane of motion, with the first clamping yoke carrying two main jaws each having a first angle clamping surface arranged at an angle of $\alpha_1 < 180$ degrees relative to the other first angle clamping surface and perpendicularly to the plane of motion so the first angle clamping surfaces form a first prismatic workpiece receiving means open towards the main jaw of the second clamping yoke, and further comprising a spindle extending parallel to the plane of motion for adjustment of the clamping yokes relative to each other.

Such clamping devices are known as so-called angle clamps from, for example, German patent 3 244 022. The disadvantage of these angle clamps is to be seen in that these are only suitable for clamping angles but are not suited for other clamping requirements occurring, for example, in a mechanical workshop.

The object underlying the invention is, therefore, to so improve a clamping device of the kind described at the beginning that it is suitable for as many as possible of the clamping requirements occurring in an ordinary workshop.

This object is accomplished in accordance with the invention with a clamping device of the kind described at the beginning by a first supplementary jaw with a first flat clamping surface which faces the main jaw of the second clamping yoke and lies closer to it than the first angle clamping surfaces being insertable into the first clamping yoke. The gist of the invention is to be seen in the fact that with the exchangeable supplementary jaw, the first clamping yoke with its angle clamping surfaces is convertible for parallel clamping and so all kinds of flat clamping requirements can be met, for example, on this first flat clamping surface.

It has proven particularly expedient for the main jaws of the first clamping yoke to be spaced from each other so that the first angle clamping surfaces end in spaced relation to each other and form a through-opening on a side of the workpiece receiving means facing away from the second clamping yoke. Hence two parts can be clamped at an angle $\alpha_1$ relative to each other in a particularly preferred manner in the first clamping yoke. It has proven advantageous, in particular for strip-shaped parts, for the main jaws of the first clamping yoke to have delimiting surfaces facing away from the second clamping yoke which include an angle of 180 degrees - $\alpha_1$ with the respective first angle clamping surfaces and stand perpendicularly on the plane of motion.

In the embodiments of the inventive solution described so far, no details were given as to the design of the second clamping yoke. This is not absolutely essential to the gist of the invention for independently of the design of the second clamping yoke and due to the design of the first clamping yoke with the main jaws and the first supplementary jaw, clamping of round parts, clamping of two parts aligned at an angle $\alpha_1$ to each other and parallel clamping with the aid of the supplementary jaw are possible. Within the scope of the inventive solution, it is, therefore, conceivable for a flat clamping surface to be made available on the second clamping yoke and this flat clamping surface can be arranged directly on the clamping yoke or on an insertable supplementary jaw.

It has, however, proven advantageous for the second clamping yoke to carry two main jaws each with a second angle clamping surface arranged at an angle of $\alpha_2 < 180$ degrees relative to the other second angle clamping surface and perpendicularly to the plane of motion so the second angle clamping surfaces form a second prismatic workpiece receiving means open towards the main jaw of the first clamping yoke.

In such an embodiment, large cylindrically or differently shaped parts can be clamped in the vertical direction in a highly advantageous manner using only the main jaws with the first and second angle clamping surfaces.

For angle clamping, it has similarly proven expedient for a second supplementary jaw with a flat clamping surface which faces the first supplementary jaw of the first clamping yoke and lies closer to it than the second angle clamping surfaces to be insertable into the second clamping yoke.

It is, furthermore, advantageous for the main jaws of the second clamping yoke to be spaced from each other so the second angle clamping surfaces end in spaced relation to each other and form a through-opening on a side of the workpiece receiving means facing away from the first clamping yoke.

In the same way as with the first clamping yoke, it is similarly advantageous for the main jaws of the second clamping yoke to have delimiting surfaces facing away from the first clamping yoke which include an angle of 180 degrees - $\alpha_2$ with the respective second angle clamping surfaces and stand perpendicularly on the plane of motion.

In the embodiments described so far, it was merely explained that the supplementary jaws are insertable into the respective clamping yoke, but it was not specified how this is to be carried out particularly expediently. To provide good support for the supplementary jaws, it is advantageous for both the first and the second supplementary jaws to be supported on the respective angle clamping surfaces.

In addition, in an advantageous embodiment, each of the supplementary jaws is held in a positively connected manner in the first clamping yoke so that a defined position is imparted to it.

Since the main jaws of both the first and the second clamping yokes must be of such stable design that the necessary clamping forces can be applied with these, it is particularly expedient for each of the supplementary jaws to embrace the main jaws of the clamping yoke in a positively connected manner as the simplest positively connected fixing is achieved in this way. In particular, this is implemented by the supplementary jaw resting in a positively connected manner against the angle clamping surfaces and the delimiting surfaces.

With the embodiments described so far, it is possible to clamp cylindrical parts and to a limited extent parts arranged at an angle to each other. It is, however, particularly expedient for a supplementary angle jaw which cooperates with the first angle clamping surfaces for angle clamping to be insertable in the second clamping yoke. The angle clamping jaw preferably comprises two third angle clamping surfaces which are arranged at an angle of 360 degrees - $\alpha_1$ to each other and are advanceable up to the first angle clamping surfaces by adjustment of the clamping yokes. Hence the same clamping requirements can be met with such a supplementary angle jaw as with the known angle clamps.

Within the scope of the present invention, it is likewise conceivable to insert in the first clamping yoke a supplementary angle jaw which, for its part, then has, for example, third clamping surfaces with an angle of 360 degrees - $\alpha_2$, which is particularly expedient when the angles $\alpha_1$ and $\alpha_2$ are of different sizes so angle clamping requirements with different angles $\alpha_1$ and $\alpha_2$ can be met with the different angles $\alpha_1$ and $\alpha_2$ and hence depending on which main jaws are worked with, the clamping device comprises two angle clamps with different angles.

In the case of the supplementary angle jaw, too, it has proven expedient for it to be held in a positively connected manner on the second clamping yoke.

For stability reasons, it is particularly expedient for the supplementary angle jaw to be supported on the main jaws of the second clamping yoke.

To likewise obtain a particularly stable connection, provision is made for the supplementary angle jaw to embrace the main jaws of the second clamping yoke in a positively connected manner; which, in particular, is implemented by the supplementary angle jaw resting in a positively connected manner against the angle clamping surfaces and the delimiting surfaces of the main jaws of the second clamping yoke.

It is expedient for all supplementary jaws held in a positively connected manner, i.e., also the supplementary angle jaws, to be fixable by holding elements.

Within the scope of the present invention, it has proven particularly expedient for the angle $\alpha_1$ to be 90 degrees so angle clamping at a right angle is possible with the first clamping yoke and its main jaws as this represents the angle clamping requirement occurring most often.

In like manner, it is advantageous for the angle $\alpha_2$ to be 90 degrees so that angle clamping at a right angle is also possible here. It does, however, also lie within the scope of the invention to provide the angle $\alpha_2$ as an alternative to the angle $\alpha_1$, for example, with 60 degrees.

To enable the supplementary jaws provided for the first and second clamping yokes to be exchanged for one another, provision is made for the main jaws of the first and second clamping yokes to be of identical design so that the first and second supplementary jaws which can be placed in a positively connected manner on these and also the supplementary angle jaw can be placed on either the first or the second clamping yoke.

To enable parallel clamping, in particular, with the flat clamping surfaces, it has proven expedient for a relative movement of the clamping yokes to be limited to one direction by a parallel guiding element which is additionally connectable with these. This parallel guiding element is preferably a guide bar which is insertable into one respective guide bore in each clamping yoke and thereby guides the clamping yokes parallel to each other.

The parallel guiding element must be aligned parallel to the spindle to enable adjustment of the clamping yokes. It is particularly expedient for the parallel guiding element to be fixable on a clamping yoke.

In a further advantageous embodiment of the inventive clamping device, provision is made for a center jaw with double-sided flat clamping surfaces to be arranged between the clamping yokes. The center jaw is guided for free displacement on two parallel guiding elements and enables two parts to be simultaneously clamped between the center jaw and one respective clamping yoke.

In principle, it is possible to design the inventive clamping device such that the spindle displaces both clamping yokes. It is, however, particularly simple for the spindle to be held on the first clamping yoke for rotation about its axis, but immovably in its axial direction. For actuation of the spindle, the latter can then protrude beyond the first clamping yoke on a side opposite the second clamping yoke and carry an actuating element, in particular a turning handle.

In such an embodiment, it is expedient for the second clamping yoke to be held on a spindle nut of the spindle.

To make it possible for wedge-shaped workpieces to also be clamped with the flat clamping surfaces in the inventive clamping device, it is advantageous for the spindle to be held on the first clamping yoke for pivotal motion about an axis perpendicular to the plane of motion.

To also meet angle clamping requirements where strip-shaped workpieces of different thicknesses are to be clamped at an angle to each other, it has proven expedient for the second clamping yoke to be held on the spindle for pivotal motion about an axis perpendicular to the plane of motion.

In the embodiments described so far, it was not explained in detail how the two clamping yokes are to be fixed. In an advantageous embodiment, provision is made for the first clamping yoke to be fixedly connected to a main body and so only the second clamping yoke is movable relative to the main body.

Guides may be provided on the main body for the second clamping yoke.

However, to enable this second clamping yoke to move freely, it is expedient for the main body to have a slide plate for the second clamping yoke on which the latter can slide and move freely on the plane of motion.

To also enable clamping of long workpieces in the vertical direction, i.e., transversely to the plane of motion, with the inventive clamping device, it has proven expedient for the first clamping yoke to be held on an arm extending from the main body. With such a solution, workpieces can be clamped particularly expediently in the vertical direction if the arm extends between the clamping yokes sidewardly from the spindle in one direction only so the workpiece can extend as far as to the spindle in the other direction.

In a particularly advantageous embodiment, the main body has a guide for an end piece of the spindle facing away from the first clamping yoke. This ensures an additional increase in the stability of the two clamping yokes, in particular in the event of high stresses.

Structurally, this is achieved in the simplest way by the guide being formed by a guide slot in a guide body surrounded by the main body so the end piece can extend into it.

In principle, the guide may be designed so as to guide the end piece of the spindle in directions opposite to each other. However, insofar as provision is made for the second clamping yoke to slide on a slide plate, it is sufficient for the guide to secure the spindle against movement away from the slide plate so that the spindle cannot move away from the slide plate during clamping with large forces.

In particular in an embodiment in which the spindle is to be pivotable relative to the clamping yokes, it is expedient for the guide to allow pivotal motion of the spindle, with pivotal motion preferably being permitted about the pivot axis of the spindle in the first clamping yoke.

In a further preferred embodiment, provision is made for the main body to comprise compartments which may serve to store, for example, the supplementary jaws and the supplementary angle jaw. For this purpose, the main body is advantageously of box-shaped design in the region of attachment to a workbench. It is expedient for a drawer to be insertable into the main body.

There is, furthermore, peculiar to all known clamping devices the problem of picking up parts which fall down, for example, also chips. Within the scope of the inventive solution, this problem can be eliminated by providing in the main body a collecting dish which is positionable in the region between the clamping yokes and below the latter. It is then advantageous for this collecting dish to be adapted to be pushed into the box-shaped main body, for example, into a compartment thereof when it is no longer required.

The diversity of the inventive clamping device is further improved by the main body comprising attachment means for supplementary apparatus. The attachment means are advantageously in the form of recesses in the main body which are insertable into the various supplementary apparatus. In particular, to enable sawing work to be carried out at different miter angles, it is expedient to provide a saw guide which is insertable in an attachment means and comprises a vertical guide extending perpendicularly to the plane of motion for a saw.

For this purpose, it is advantageous to provide the vertical guide with a horizontal guide in which the saw is guided for displacement in the sawing direction.

The diversity of the inventive clamping device can also be increased by the main body having an anvil. This anvil is advantageously arranged on a side of the main body opposite the first clamping yoke, or two anvils are arranged laterally on opposite sides of the main body. It is, furthermore, expedient for the anvil to have edges for bending or beading.

Figure 2:
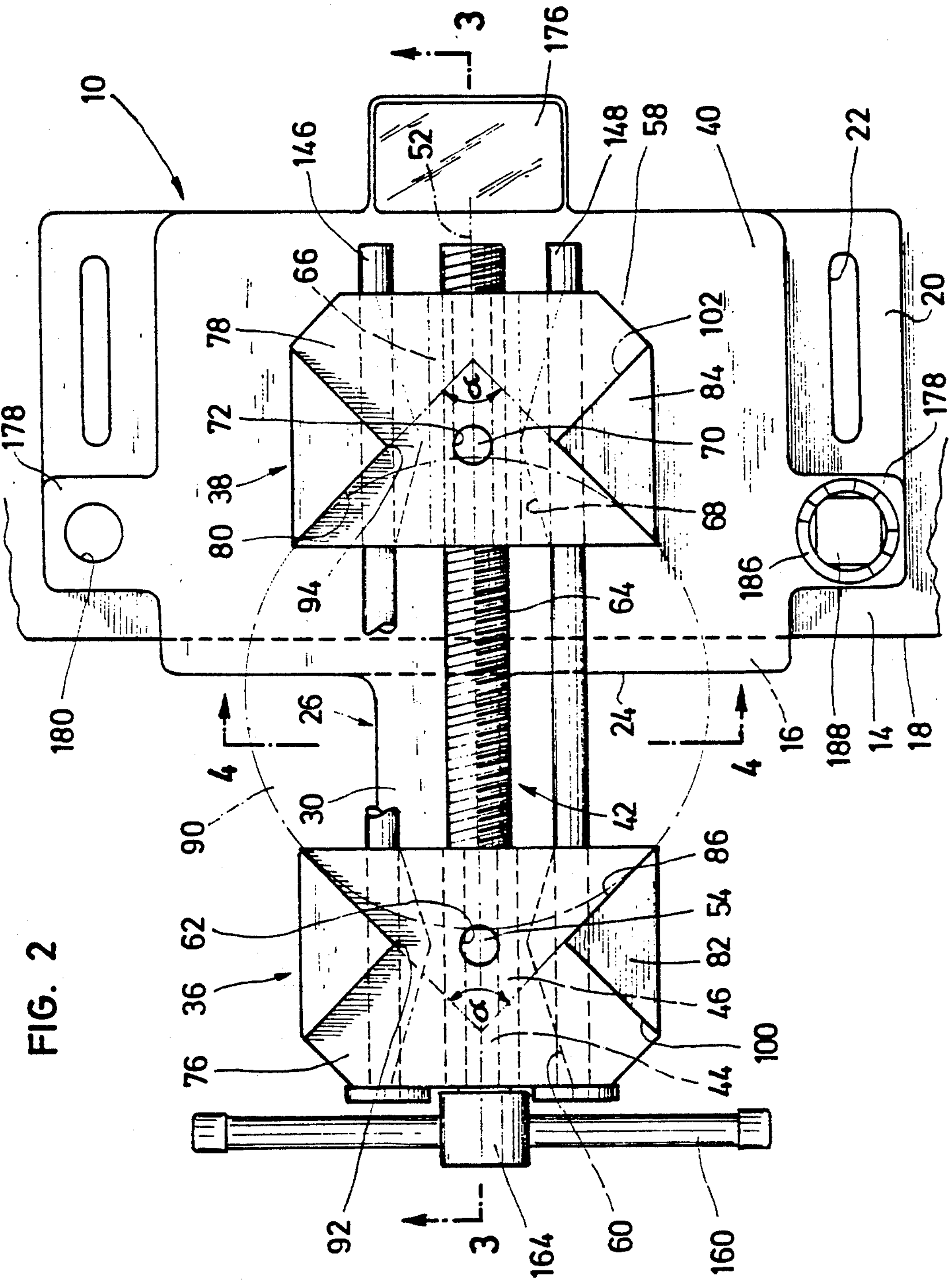
Figure 3:
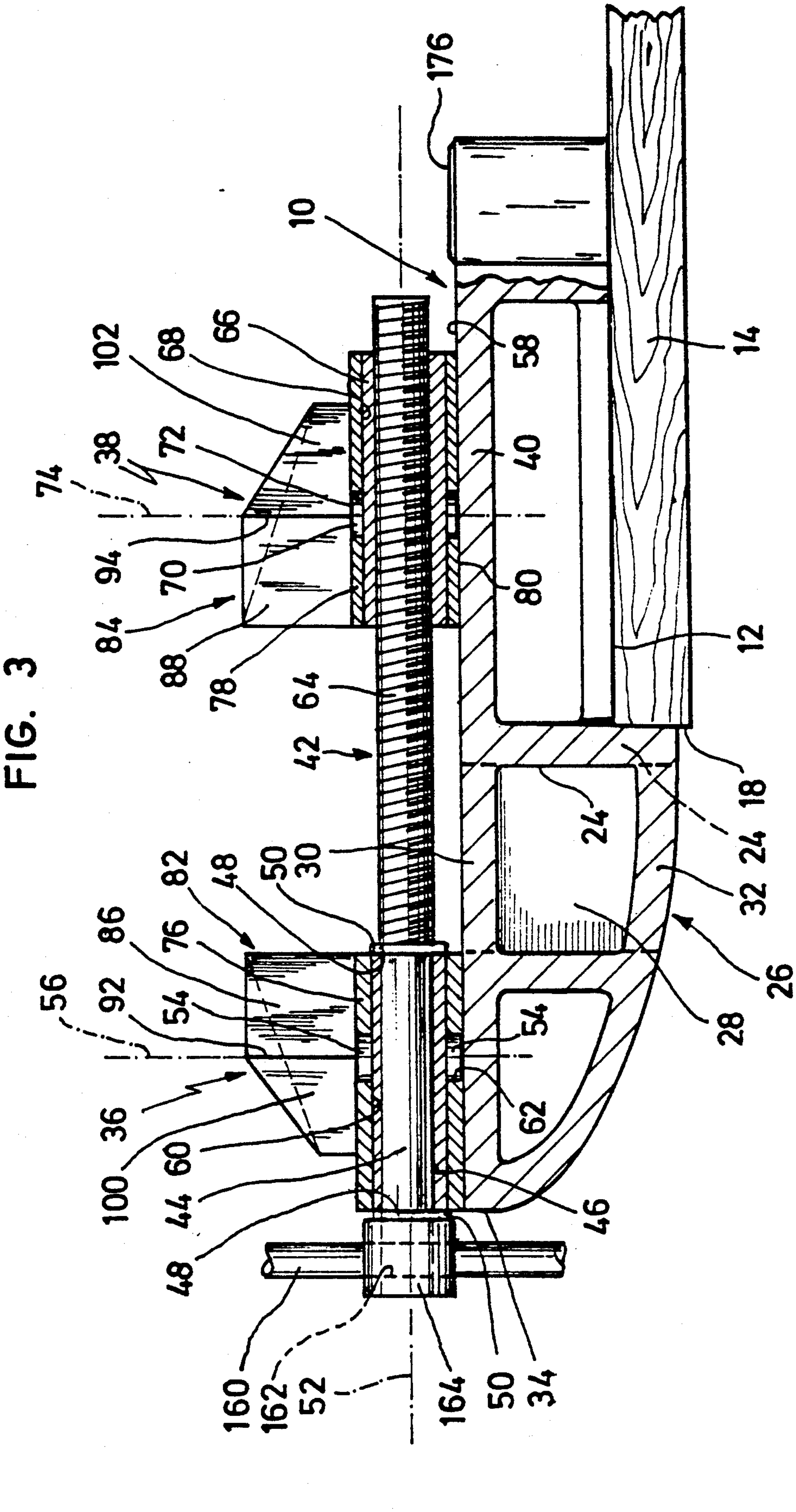
Figure 4:
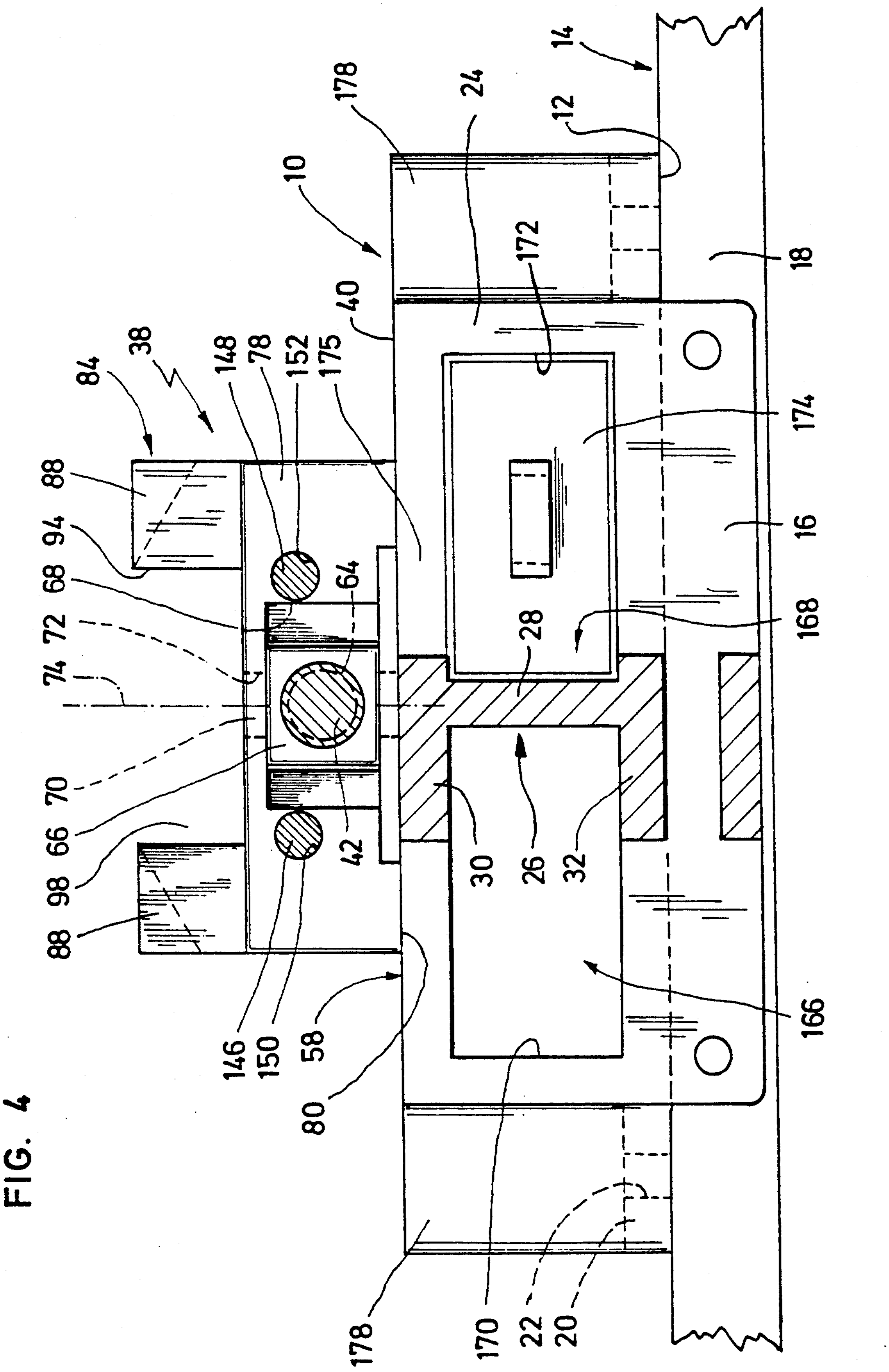
Figure 5:
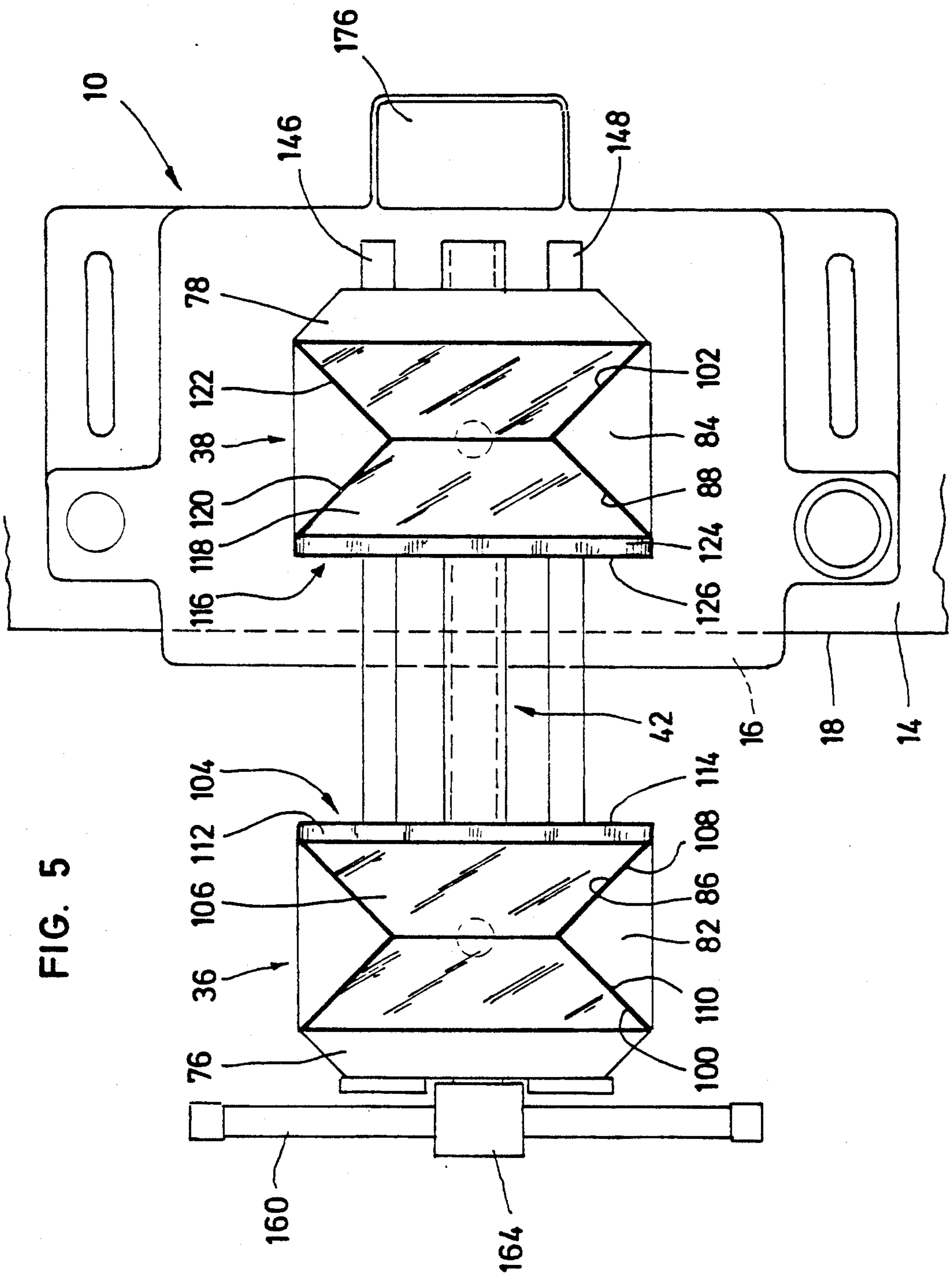
Figure 6:
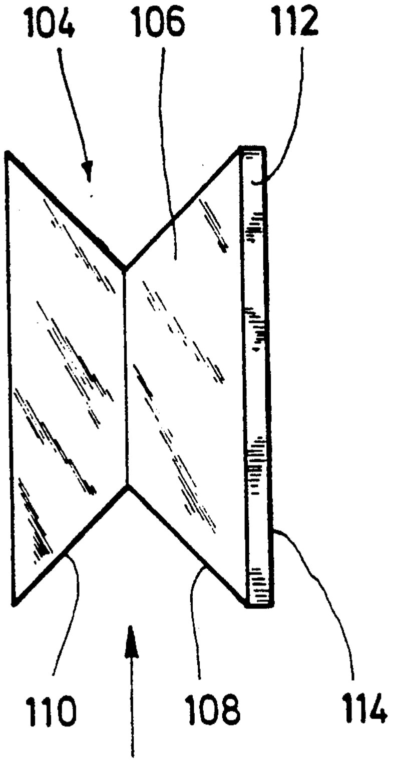
Figure 7:
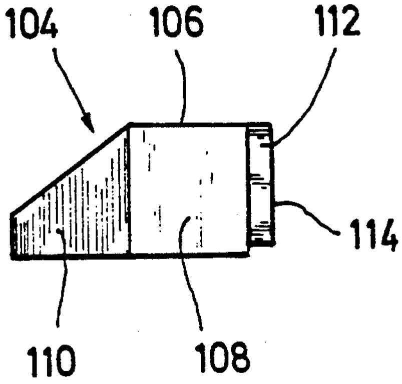
Figure 8:
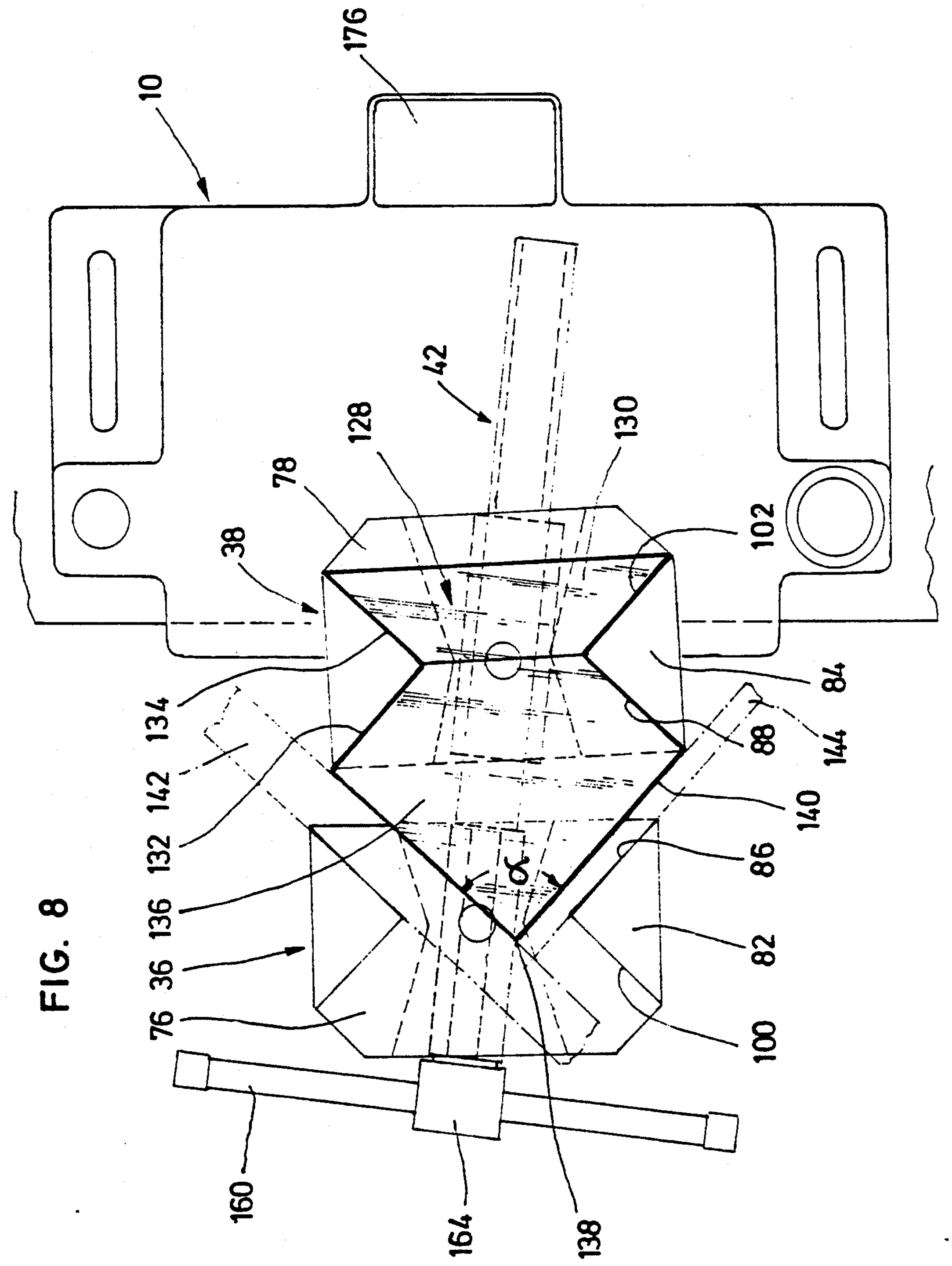
Figure 9:
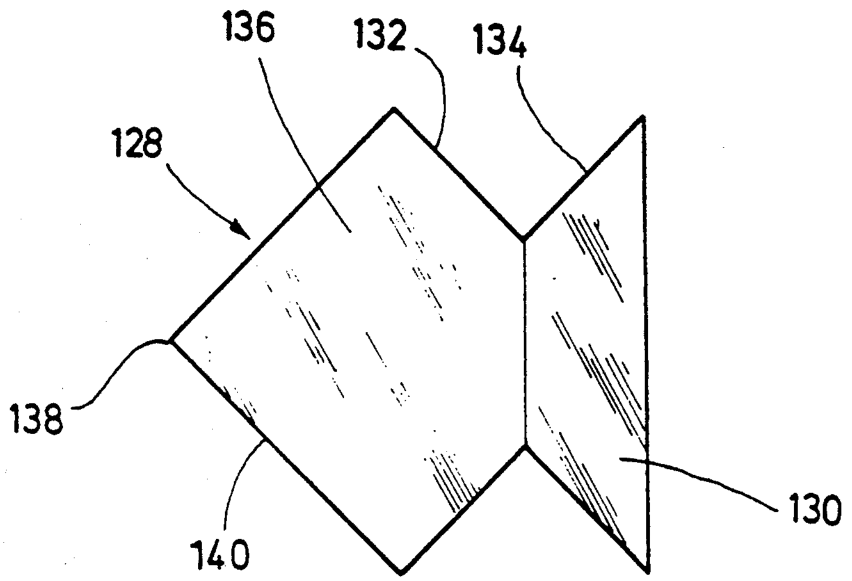
Figure 10:
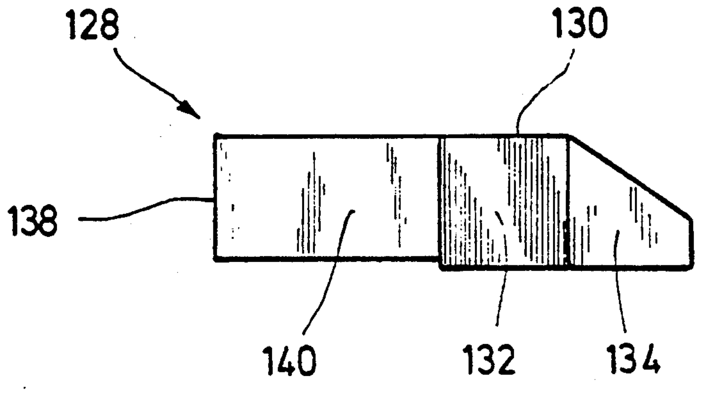
Figure 11:
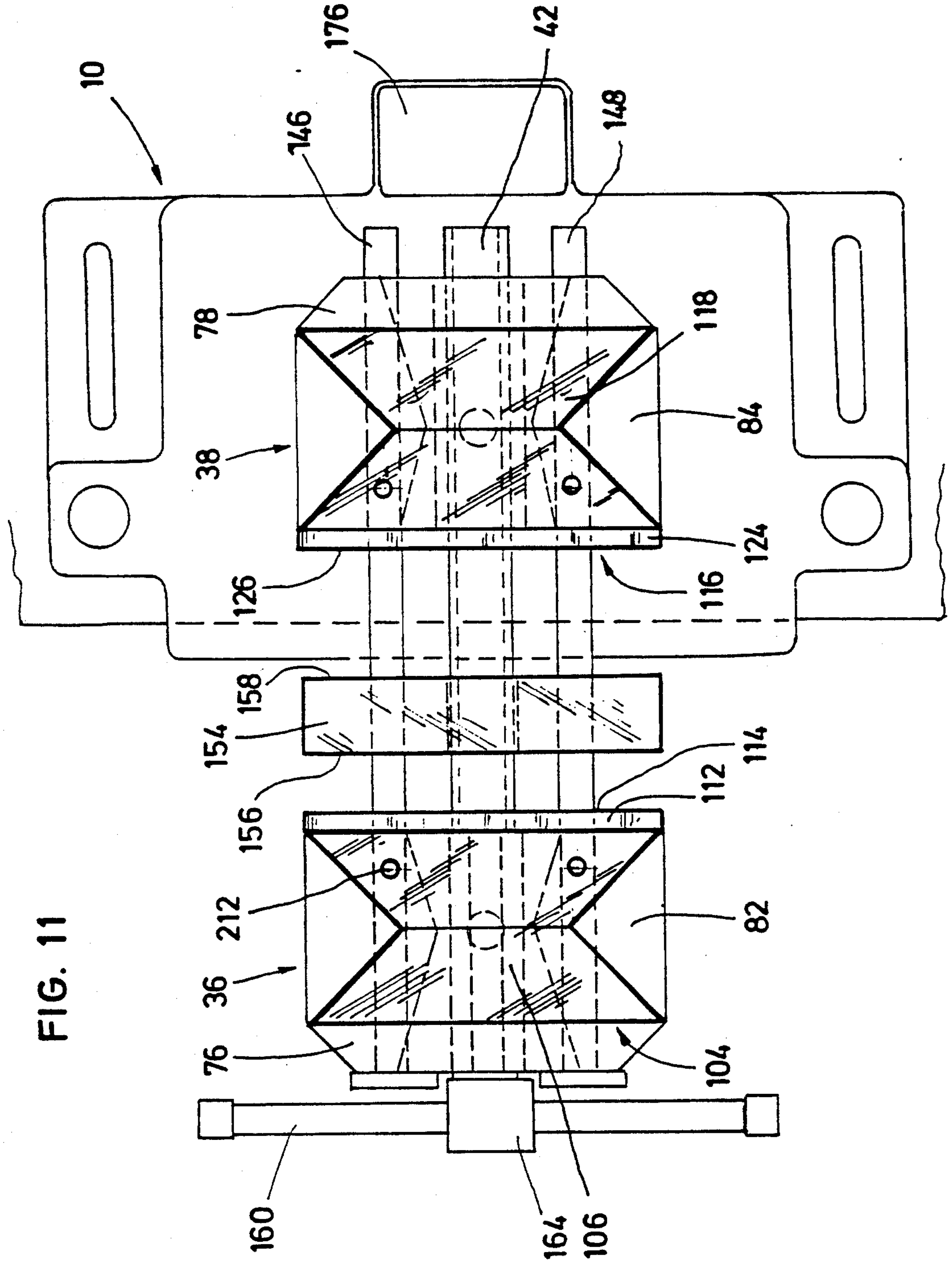
Figure 12:
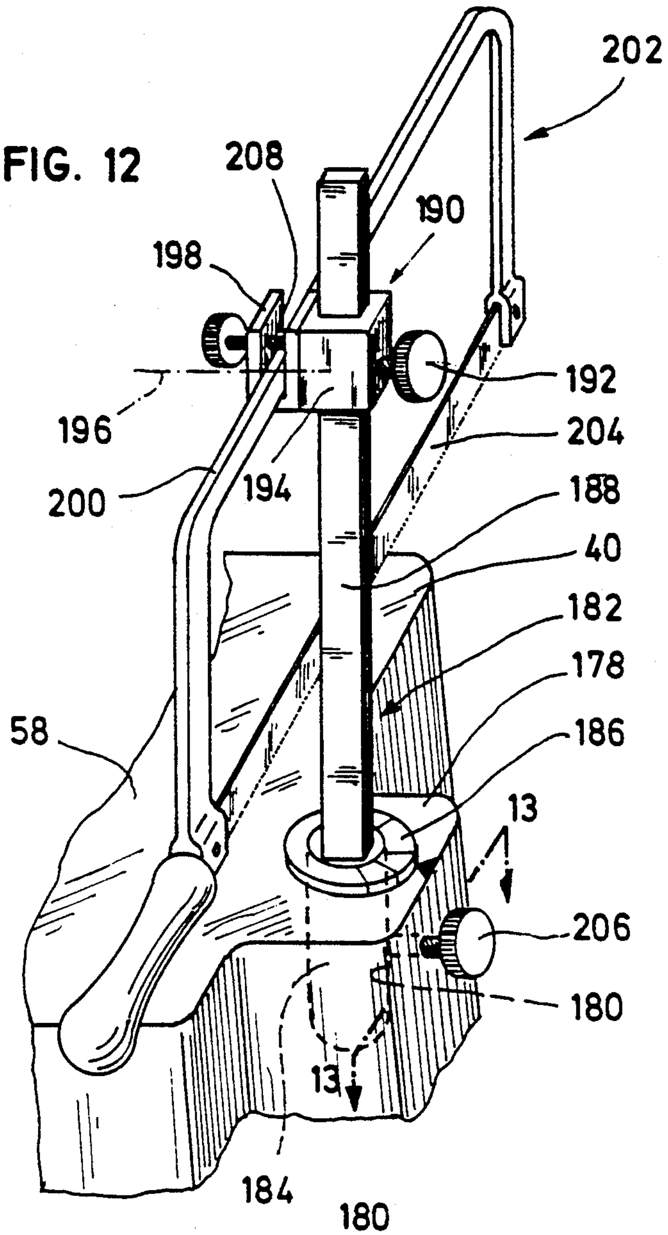
Figure 13:
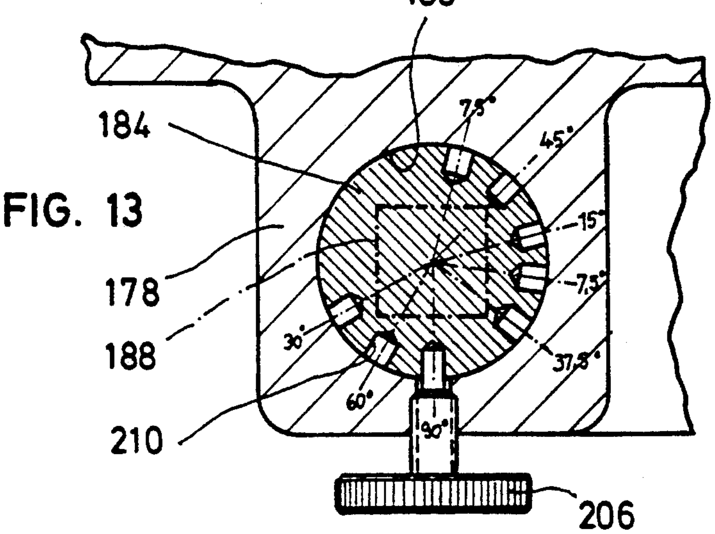
Figure 14:
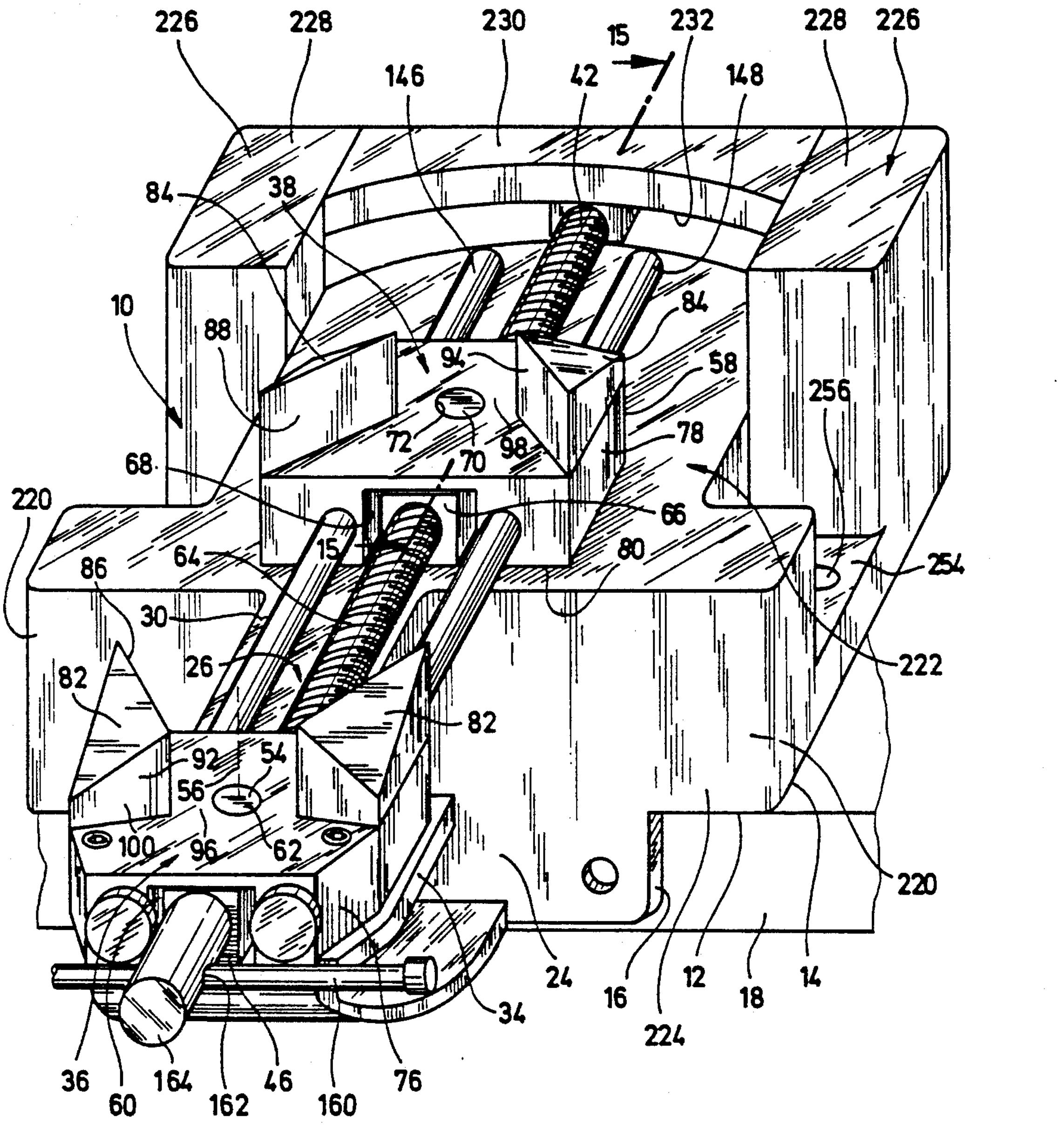

Further features and advantages of the invention are the subject matter of the following description and the drawings of an embodiment. The drawings show:

FIG. 1 a perspective overall view of a first embodiment;

FIG. 2 a plan view of the embodiment according to FIG. 1;

FIG. 3 a section along line 3—3 in FIG. 2;

FIG. 4 a section along line 4—4 in FIG. 2;

FIG. 5 a plan view of the embodiment provided with first and second supplementary jaws;

FIG. 6 a plan view of the first supplementary jaw;

FIG. 7 a side view of the first supplementary jaw;

FIG. 8 a plan view of the embodiment provided with an angle clamping jaw;

FIG. 9 a plan view of the angle clamping jaw;

FIG. 10 a side view of the angle clamping jaw;

FIG. 11 a plan view of the first embodiment with first and second supplementary jaws and with a center jaw;

FIG. 12 a perspective partial view of the first embodiment with a saw guide;

FIG. 13 a section along line 13—13 in FIG. 12;

FIG. 14 a perspective overall view of a second embodiment; and

Figure 15:
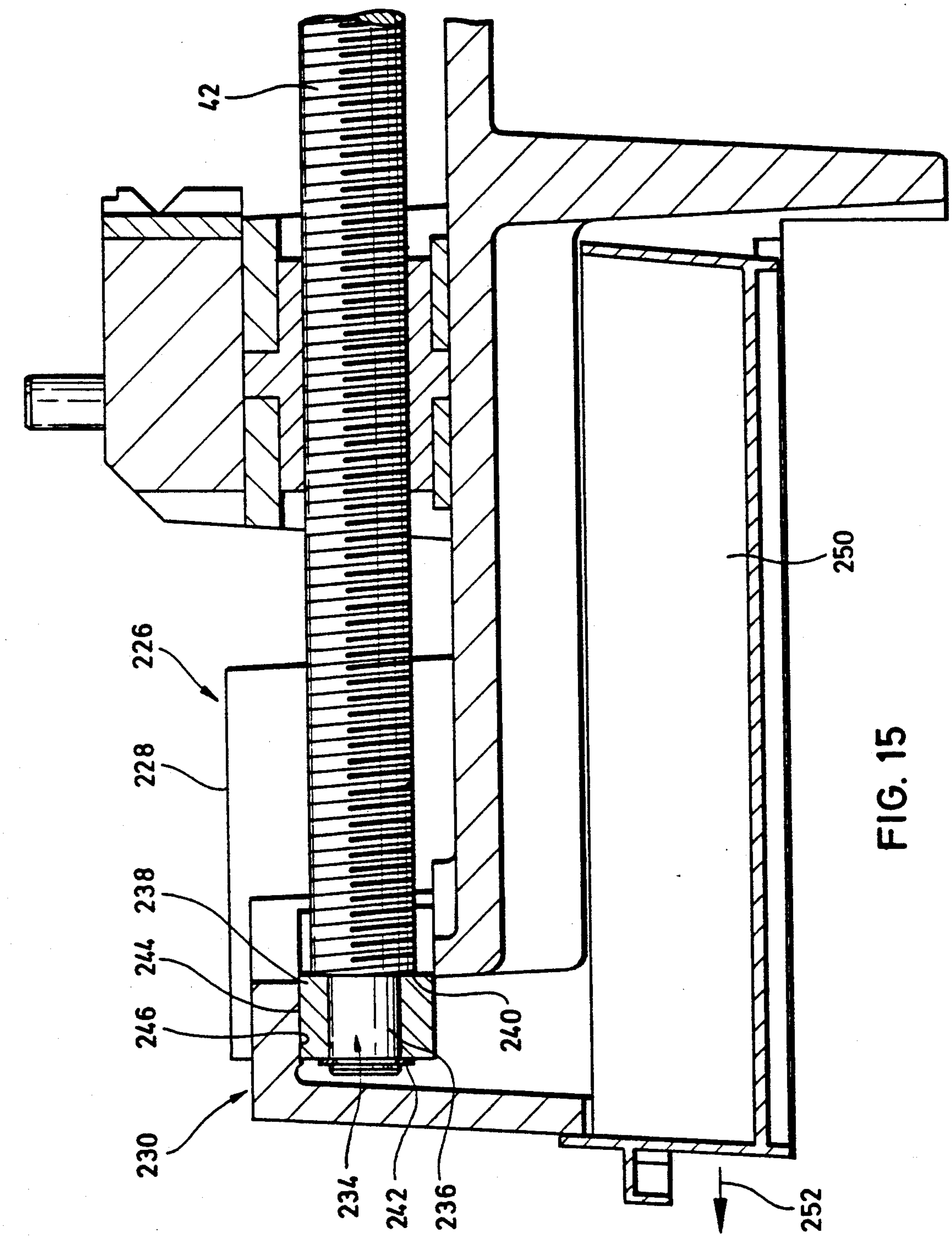

FIG. 15 a partial section along line 15—15 in FIG. 14.

An embodiment of the inventive clamping device, illustrated in FIG. 1, comprises a box-shaped main body 10 which can be placed with a bottom supporting surface 12 on a table 14 or a similar base. Integrally formed on this box-shaped main body 10 is a front abutment shoulder 16 which protrudes downwards at a right angle to the supporting surface 12 for attachment to a front edge 18 of the table 14. In a region remote from the abutment shoulder 16, fastening links 20 with an elongate hole 22 are also integrally formed on the main body 10 for attachment of the latter to the table 14.

The abutment shoulder 16 is designed as part of a front side 24 of the box-shaped main body 10 via which, as shown, in particular in FIG. 4, an arm 26, comprising a vertical center web 28 and two transverse webs 30 and 32 integrally formed on either side thereof in T-shaped configuration, protrudes forwards.

A first clamping yoke 36 is fixedly mounted on a front end 34 of this arm 26, while a second clamping yoke 38 is displaceable on a slide plate 40 of the main body 10 located opposite the supporting surface 12. This slide plate 40 closes off the top of the box-shaped main body 10 and passes into the transverse web 30 of the arm 26, thereby extending as far as to the first clamping yoke 36.

A spindle 42 extending through both clamping yokes 36, 38 is provided for displacing the second clamping yoke 38 on the slide plate 40. As shown in FIGS. 2 and 3, the spindle 42 has in the region of its front end a thread-free section 44 which is rotatably mounted in a spindle bearing block 46. The thread-free section 44 is delimited on both sides by annular discs 48 which each rest against end faces 50 of the spindle bearing block 46 so the spindle 42 as a whole is held in the spindle bearing block 46 so as to be immovable in the direction of its longitudinal axis 52 but rotatable about the longitudinal axis 52.

The spindle bearing block 46, for its part, is provided with oppositely located pins 54 arranged coaxially with a first pivot axis 56 which stands perpendicularly on a plane of motion 58 of the second clamping yoke 38 defined by the slide plate 40.

The spindle bearing block 46 is received in the first clamping yoke 36 in an opening 60 which extends through the latter and is wider than the spindle bearing block 46 transversely to the first pivot axis 56 so the spindle bearing block is pivotable about the first pivot axis 56. The pivotable mounting of the spindle bearing block 46 is implemented by the pins 54 engaging bores 62 of the first clamping yoke 36. To provide optimal pivoting possibilities for the spindle bearing block 46, the opening widens from the bores 62 outwards in the direction of the longitudinal axis 52 of the spindle 42.

Adjoining the thread-free section 44, the spindle 42 has in the region thereof extending over the slide plate 40 a threaded section 64 carrying a spindle nut 66. The spindle nut 66 is of similar design to the spindle bearing block 46. It is likewise arranged in an opening 68 of the second clamping yoke 38 and has pins 70 which likewise extend into bores 72 of the second clamping yoke 38 and thereby mount the spindle nut 66 on the second clamping yoke 38 for pivotal motion about a second pivot axis 74 which likewise stands perpendicularly on the plane of motion 58. The opening 68 is designed in the same way as the opening 60 in that it widens in the outward direction starting from the bores 72 to enable adequate pivoting of the spindle nut 66.

Both the first clamping yoke 36 and the second clamping yoke 38 each comprise a main block 76 and 78, respectively, but the main block 76 of the first clamping yoke 36 is firmly screwed to the front end 34 of the arm 26 while the second main block 78 has a sliding surface 80 facing the slide plate 40 for supporting itself on the slide plate 40.

Two main jaws 82 and two main jaws 84, respectively, arranged symmetrically with the respective pivot axis 56 and 74, respectively, rise from the respective main block 76 and 78, respectively. Each of the main jaws 82 has a first angle clamping surface 86 and each of the main jaws 84 a second angle clamping surface 88. As shown in FIG. 2, the first two angle clamping surfaces 86 of the main jaws 82 are arranged at an angle $\alpha=90$ degrees relative to each other and form a prismatic receiving means opening towards the second clamping yoke 38 for a workpiece 90 which may, for example, be a round cylinder. The second angle clamping surfaces 88 of the two main jaws 84 are likewise arranged at an angle of $\alpha=90$ degrees relative to each other and similarly form a prismatic receiving means open towards the first clamping yoke 36 for the workpiece 90.

The two main jaws 82 and 84, respectively, do not touch each other with their first and second angle clamping surfaces 86 and 88, respectively, but rather the latter are arranged with their inner side edges 92 and 94, respectively, in spaced relation to each other so as to leave between the two main jaws 82 and 84, respectively, a through-opening 96 and 98, respectively, delimited by the inner side edges 92 and 94, respectively.

Adjoining these inner side edges 92 and 94, respectively, on a side opposite the respective other clamping yoke 38 and 36, respectively, are rear delimiting surfaces 100 and 102, respectively, which include with the first angle clamping surfaces 86 and the second angle clamping surfaces 88, respectively, an angle of 180 degrees - $\alpha$, i.e., likewise 90 degrees. Both the first angle clamping surfaces 86 with the associated delimiting surfaces 100 and the second angle clamping surfaces 88 with the associated delimiting surfaces 102 stand perpendicularly on the plane of motion 58.

A first supplementary jaw 104 with a supporting body 106 which engages between the two main jaws 82 can be placed on the first clamping yoke 36. The supporting body 106 lies with supporting surfaces 108 against the first angle clamping surfaces 86 and engages behind the main jaws 82 by holding surfaces 110 resting against the delimiting surfaces 100 so the supporting body 106 is received in a positively connected manner between the two main jaws 82 and can be lifted off upwards perpendicularly to the plane of motion 58. The first supplementary jaw 104 is, furthermore, provided with a flat clamping jaw 112 which is held on the supporting body 106 and carries a flat clamping surface 114. The flat clamping jaw 112 is held on the region of the supporting body 106 carrying the supporting surfaces 108 and arranged so as to point with its flat clamping surface 114 in the direction of the second clamping yoke 38 when the first supplementary jaw 104 is inserted in the first clamping yoke 36, with the flat clamping surface standing perpendicularly on the plane of motion 58 and preferably including the same angle with the two supporting surfaces 108 arranged on opposite sides of the supporting body 106.

A second supplementary jaw 116 designed in the same way can be placed on the second clamping yoke 38 and similarly comprises a supporting body 118 with supporting surfaces 120 and holding surfaces 122 so that it can likewise be placed from above on the second clamping yoke 38 and is held in a positively connected manner by the main jaws 84. In addition, in the same manner as in the first supplementary jaw 104, a flat clamping jaw 124 is provided with a flat clamping surface 126.

With the first and the second supplementary jaws 104 and 116, respectively, the inventive clamping device is constructed like a conventional vise but with the additional advantages that the spindle 40 is articulatedly mounted on both the first clamping yoke 36 and the second clamping yoke 38 and, therefore, in addition to parallel clamping, wedge-shaped parts can also be clamped.

Instead of the first supplementary jaw 104 or the second supplementary jaw 108, it is, however, also possible, as shown in FIGS. 8 to 10, for a supplementary angle jaw 128 to be insertable in the respective clamping yoke 36 and 38, respectively. In FIG. 8, this supplementary angle jaw 128 is inserted in the second clamping yoke 38. This supplementary angle jaw 128 also comprises a supporting body 130 which rests by means of supporting surfaces 132 and holding surfaces 134 in a positively connected manner against the second angle clamping surfaces 88 and the delimiting surfaces 102 in the same way as the first or second supplementary jaw 104 and 116, respectively, and is removable in the upward direction. In contrast with the first or second supplementary jaws 104 and 116, respectively, the supplementary angle jaw carries an angle clamping jaw 136 protruding in the direction of the first clamping yoke 36 with a tip 138 pointing towards the first clamping yoke 36 with adjoining third angle clamping surfaces 140 on both sides thereof which, for their part, are arranged at an angle of $\alpha=360$ degrees - $\beta$ relative to each other.

When working with such a supplementary angle jaw 128 in the second clamping yoke 38, one works without a supplementary jaw in the first clamping yoke 36 so the angle clamping jaw 136 protrudes into the prismatic receiving means formed by the first angle clamping surfaces 86 and hence is, for example, capable of clamping two strip-shaped workpieces 142 and 144 at an angle relative to each other, as shown in FIG. 8. If the strip-shaped workpieces 142 and 144 are of different thicknesses, this is compensated by the spindle 42 being pivoted relative to the two clamping yokes 36 and 38, respectively, and hence the second clamping yoke 38 is advanced relative to the first clamping yoke in a laterally displaced position towards the latter, with the second clamping yoke 38 being able to slide with the sliding surface 80 on the slide plate 40 both in the direction of the longitudinal axis 52 of the spindle 42 and transversely thereto.

To enable exact parallel clamping with the embodiment of the inventive clamping device according to FIG. 5, provided with the first supplementary jaw 104 and the second supplementary jaw 116, the two clamping yokes 36 and 38, respectively, can be fixed in an initial position relative to each other such that their flat clamping surfaces 114 and 126 stand parallel to each other and the longitudinal axis 52 of the spindle also preferably extends parallel to the plane of motion 58 and perpendicularly to the flat clamping surfaces 114 and 126, respectively. This fixing is preferably implemented by two guide bars 146 and 148, respectively, which extend in guide bores 150 and 152, respectively, through both the first clamping yoke 36 and the second clamping yoke 38 on either side of the spindle 42 parallel to its longitudinal axis 52 so the second clamping yoke 38 slides exactly parallel to the first clamping yoke 36 on the slide plate 40 owing to these guide bars 146 and 148, respectively. These guide bars 146, 148 are removable so that, for example, in the case of angle clamping according to FIG. 8, one can work without these.

To increase the flexibility of the inventive clamping device, during parallel clamping with the first and second supplementary jaws using the guide bars 146 and 148, respectively, a center jaw 154 may be used in addition. This is slidingly guided on the guide bars 146 and 148, respectively, and has two flat clamping surfaces 156 and 158 which are oriented parallel to the flat clamping surfaces 114 and 126. The center jaw 154 is freely movable between the first clamping joke 36 and the second clamping yoke 38 and so two different parts can be simultaneously clamped between the flat clamping surface 114 and the flat clamping surface 156 and between the flat clamping surface 158 and the flat clamping surface 126.

Furthermore, to enable flat clamping of parts extending perpendicularly to the plane of motion 58, in particular at least without use of the guide bar 148, the transverse webs 30 and 32, as shown, in particular in FIGS. 4 and 5, are of asymmetrical design relative to the center web 28 so that these extend in FIG. 4 substantially to the left, but only to a slight extent - approximately as far as an outer circumference of the spindle 42 - to the right so that such a workpiece can be clamped to the right of the spindle 42 without being obstructed by the transverse webs 30 and 32, respectively.

Turning of the spindle 42 is carried out in the well-known manner by a lever 160 which is slidingly mounted in a bore 162 of an end piece 164 of the spindle, with the end piece 164 protruding forwards beyond the first clamping yoke 36 and hence adjoining the thread-free section 44 opposite the threaded section 64.

The box-shaped main body 10 is additionally provided with two compartments 166, 168 which are accessible through front openings 170 and 172, respectively, in the front side 24 of the main body 10. The compartments 166, 168 may, for example, serve to accommodate the first and second supplementary jaws 104, 116 or also the supplementary angle jaw 128. In addition, there is mounted in the compartment 168 for withdrawal therefrom a collecting dish 174 which lies with its upper edge above the plane of motion 58 and hence can be pulled out so far that it extends under a clearance 175 delimited by the guide plate 40, the transverse web 30 and the front end 34 and thereby, for example, receives all the chips occurring in the region between the clamping yokes 36, 38 or also other parts. The collecting dish 174 is preferably mounted in a frame with drawer-like guides, for example, pull-out rails.

An anvil 176 with edges for bending and beading is integrally formed as accessory on the main body 10 opposite the front end 34. Side bodies 178 with receiving bores 180 extending perpendicularly to the plane of motion 58 for supplementary apparatus are provided on both sides of the main body 10. As shown in FIG. 12, vertical guides 182 are, for example, insertable in these receiving bores. The vertical guides have a cylindrical end piece 184 which is insertable in the receiving bore 180 and is supported with an annular collar 186 on an upper edge of the receiving bore 180. Extending upwards from the annular collar 186 is a four-edged guide 188 on which a saw guide 190 is displaceable in the vertical direction and fixable by a set screw 192. The saw guide 190 comprises a guide block 194 which surrounds the four-edged guide 188 on all sides and on which a U-shaped receiving means 198 is mounted for pivotal motion about a horizontal axis 196. Displaceably mounted in this U-shaped receiving means 198 is, for example, a saw 202 having a rectangular tube 200 and being guided by the U-shaped receiving means 198 in such a way that a saw blade 204 of the saw 202 is vertically oriented.

To fix a miter angle of the saw blade 204 relative to a workpiece clamped between the clamping yokes 36 and 38, the entire vertical guide 182 is rotatable in the receiving bore 180 and fixable in its turned position by, for example, a set screw 206, with the set screw 206 acting on the end piece 184.

To prevent the saw 202 from falling out of the U-shaped receiving means 198, the latter is closable by a cotter pin 208 which is arranged such that the rectangular tube 200 is movable in its longitudinal direction in the receiving means 198 but cannot leave the latter on its open side.

As an alternative to receiving the saw 202, the inventive vertical guides 182 may also guide tracing aids, receive bridges or act as carriers for lamps.

In a particularly preferred embodiment of the inventive four-edged guide 182, the end piece 184 is provided with fixing recesses 210 which exhibit identical angular spacings from one another in all quadrants but are machined in the end piece 184 so as to begin with a different initial angle in each quadrant. For example, 90 degree, 60 degree and 30 degree bores are provided in one quadrant, 75 degree, 45 degree and 15 degree bores in the opposite quadrant and 7.5 degree and 37.5 degree bores in the quadrant therebetween (FIG. 13).

As shown additionally in FIG. 11, the supporting bodies 106 and 118, respectively, are fixable on the clamping yokes 36 and 38, respectively, by screws 212. Alternatively, the screws 212 may also be designed as locking elements.

In a second embodiment, illustrated in FIGS. 14 and 15, insofar as the same parts are used, these bear the same reference numerals and, therefore, reference is to be had in this connection to the statements on the first embodiment.

In contrast with the first embodiment, the main body 10 comprises two side bodies 220 which are arranged on both sides of a center body 222 and with their front sides 224 terminate flush with the front side 24 of the center body 222. Spaced from these side bodies on a side opposite the arm 26 laterally of the center body 222 are two anvil bodies 226 which extend upwards beyond the plane of motion 58 and enclose the plane of motion 58 between them in the rear region of the center body 222. Each of the anvil bodies 226 is provided with an anvil surface 228 extending substantially parallel to the plane of motion 58.

Extending between these anvil bodies 226 is a guide body 230 with a guide slot 232 which is open towards the second clamping yoke and into which the spindle 42 extends with a rear end piece 234 opposite the shaft piece 164. With this end piece 234, the spindle is guided in the guide slot 232. For this purpose, the end piece 234 of the spindle 42 is provided with a cylindrical, thread-free attachment 236 which is rotatably mounted in a slide piece 238. This slide piece 238 is held non-displaceably by the end piece 234 by an annular flange 240 adjoining the cylindrical attachment 236 at the transition to the threaded section 64 and a safety ring 242 being seated on the opposite side of the attachment 236.

This slide piece 238 has on its top side opposite the slide surface 58 an abutment surface 244 which rests slidingly on a guide surface 246 of the guide body 230.

Owing to the rotatable mounting of the cylindrical attachment 236 in the slide piece 238, the spindle 42 can be turned without the slide piece 238 turning with it.

The guide slot 232 is designed so as to represent a segment of an arc of a circle concentric with the pivot axis 56 of the pin 54 and lying parallel to the plane of motion 58 so that during all pivotal motions of the spindle 42 about the pivot axis 56, the slide piece 238 can run with the abutment surface 244 along the guide surface 246 which likewise has the shape of an arc of a circle.

The spindle 42 is additionally secured against lifting in the direction perpendicular to the plane of motion 58 by the guide surface 246. Securing of the spindle 42 against movement in the direction towards the plane of motion 58 is unnecessary as the clamping yoke 38 itself lies directly slidingly on the plane of motion 58 and hence prevents such movement of the spindle.

For reception of the end piece 234 in a simple manner, the guide body 230 is preferably of hollow design, and in the simplest case is integrally formed on the center body 222.

Additionally provided in the center body 222 instead of the collecting dish 174 is a drawer 250 which can be pulled rearwardly out of the center body 222 in the direction of arrow 252.

The main body 10 is preferably attached by attachment links 254 which extend laterally of the center body 222 between the respective side body 220 and the respective anvil body 226 and preferably have an elongate hole 256 for attachment.

What is claimed is:

1. A clamping device comprising:
- a first and a second clamping yoke adjustable relative to each other in a plane of motion;
- said first clamping yoke carrying two main jaws each having a first angle clamping surface standing perpendicularly to said plane of motion;
- said first angle clamping surfaces together forming a first prismatic workpiece receiving means open towards a main jaw of said second clamping yoke and enclosing an angle of $\alpha_1 < 180$ degrees;
- said main jaws of said first clamping yoke being spaced from each other so that said first angle clamping surfaces end in spaced relation to each other and form a through-opening on a side of said workpiece receiving means facing away from said second clamping yoke;
- said main jaws of said first clamping yoke comprising delimiting surfaces facing away from said second clamping yoke, said delimiting surfaces including an angle of $(180-\alpha_1)$ degrees with said respective first angle clamping surfaces and standing perpendicularly to said plane of motion;
- a spindle extending parallel to said plane of motion for adjustment of said clamping yokes relative to each other; and
- a supplementary jaw adapted for insertion in said first clamping yoke, said first supplementary jaw having a first flat clamping surface facing said main jaw of said second clamping yoke and being arranged closer to the main jaw of said second clamping yoke than said first angle clamping surfaces are when the supplementary jaw is inserted in said first clamping yoke.

2. A clamping device as defined in claim 1 further comprising means for providing a flat clamping surface on said second clamping yoke.

3. A clamping device comprising:
- a first and a second clamping yoke adjustable relative to each other in a plane of motion;
- said first clamping yoke carrying two main jaws each having a first angle clamping surface standing perpendicularly to said plane of motion;
- said first angle clamping surfaces together forming a first prismatic workpiece receiving means open towards a main jaw of said second clamping yoke and enclosing an angle of $\alpha_1 < 180$ degrees;
- said second clamping yoke carrying two main jaws each having a second angle clamping surface standing perpendicularly to said plane of motion;
- said second angle clamping surfaces forming a second prismatic workpiece receiving means open towards said main jaws of said first clamping yoke and enclosing an angle of $\alpha_2 < 180$ degrees;
- said main jaws of said second clamping yoke being spaced from each other so that said second angle clamping surfaces end in spaced relation to each other and form a through-opening on a side of said workpiece receiving means facing away from said first clamping yoke;
- said main jaws of said second clamping yoke comprising delimiting surfaces facing away from said first clamping yoke, said delimiting surfaces including an angle of $(180-\alpha_2)$ degrees with said respective second angle clamping surfaces and standing perpendicularly to said plane of motion;
- a spindle extending parallel to said plane of motion for adjustment of said clamping yokes relative to each other; and
- a supplementary jaw adapted for insertion in said first clamping yoke, said supplementary jaw having a first flat clamping surface facing said main jaws of said second clamping yoke and being arranged closer to the main jaws of said second clamping yoke than said first angle clamping surfaces are when the supplementary jaw is inserted in said first clamping yoke.

4. A clamping device as defined in claim 1 wherein said second clamping yoke carries two main jaws each having a second angle clamping surface standing perpendicularly to said plane of motion, said second angle clamping surfaces together forming a second prismatic workpiece receiving means that is open towards said first clamping yoke and encloses an angle of $\alpha_2 < 180$ degrees.

5. A clamping device as defined in claim 4 further comprising a second supplementary jaw adapted for insertion in said second clamping yoke with a second flat clamping surface thereof facing said main jaws of said first clamping yoke and being arranged closer to the main jaws of said first clamping yoke than said second prismatic workpiece receiving means are when the second supplementary jaw is inserted in said second clamping yoke.

6. A clamping device as defined in claim 5 wherein said second prismatic workpiece receiving means include a through-opening on a side thereof facing away from said first clamping yoke;
- said two main jaws of said second clamping yoke each comprising a delimiting surface facing away from said first clamping yoke, said delimiting surfaces of said second clamping yoke including an angle of $(180-\alpha_2)$ degrees with said respective second angle clamping surfaces and standing perpendicularly to said plane of motion.

7. A clamping device as defined in claim 1 wherein a supplementary angle jaw is adapted for insertion in said second clamping yoke and cooperates with said first angle clamping surfaces for angle clamping when inserted into said second clamping yoke.

8. A clamping device comprising:

a first and a second clamping yoke adjustable relative to each other in a plane of motion;

said first clamping yoke carrying two main jaws each having a first angle clamping surface standing perpendicularly to said plane of motion, said first angle clamping surfaces together forming a first prismatic workpiece receiving means enclosing an angle of $\alpha_1<180$ degrees that is open towards said second clamping yoke;

a spindle extending parallel to said plane of motion for adjusting said clamping yokes relative to each other;

a supplementary jaw adapted for insertion in said first clamping yoke, said supplementary jaw having a first flat clamping surface facing said second clamping yoke and being arranged closer to the second clamping yoke than said first clamping surfaces are when the supplementary jaw is inserted in said first clamping yoke; and a supplementary angle jaw adapted for insertion in said second clamping yoke, said supplementary angle jaw cooperating with said first angle clamping surfaces for angle clamping when inserted in said second clamping yoke, said supplementary angle jaw comprising two third angle clamping surfaces arranged at an angle of $(360-\alpha_1)$ degrees with respect to each other and advanceable up to said first angle clamping surfaces by adjustment of said clamping yokes.

9. A clamping device as defined in claim 8 wherein:

said second clamping yoke carries two main jaws each having a second angle clamping surface standing perpendicularly to said plane of motion, said second angle clamping surfaces together forming a second prismatic workpiece receiving means enclosing an angle of $\alpha_2<180$ degrees that is open towards said first clamping yoke; and at least one of said supplementary jaw and said supplementary angle jaw being supported on the angle clamping surfaces of its respective clamping yoke.

10. A clamping device comprising:

a first and a second clamping yoke adjustable relative to each other in a plane of motion;

one of said clamping yokes carrying two main jaws each having a first angle clamping surface standing perpendicularly to said plane of motion, said first angle clamping surfaces together forming a first prismatic workpiece receiving means that is open towards said other clamping yoke;

a spindle extending parallel to said plane of motion for adjusting said clamping yokes relative to each other; and a supplementary jaw adapted for insertion in said one clamping yoke, said supplementary jaw having a clamping surface facing said other clamping yoke;

wherein said supplementary jaw is supported by said angle clamping surfaces of said one clamping yoke and is positively connected to said clamping yoke.

11. A clamping device as defined in claim 10 wherein said supplementary jaw is positively connected to said main jaws by embracing said main jaws of said one clamping yoke.

12. A clamping device as defined in claim 11 wherein the main jaws of the first and second clamping yokes are of identical design.

13. A clamping device comprising:

a first and a second clamping yoke adjustable relative to each other in a plane of motion;

said first clamping yoke carrying two main jaws each having a first angle clamping surface standing perpendicularly to said plane of motion, said first angle clamping surfaces together forming a first prismatic workpiece receiving means that is open towards said second clamping yoke and enclosing an angle of $\alpha_1<180$ degrees;

a spindle extending parallel to said plane of motion for adjusting said clamping yokes relative to each other, said spindle being held on said first clamping yoke for pivotal motion about an axis perpendicular to said plane of motion; and a supplementary jaw adapted for insertion in said first clamping yoke, said supplementary jaw having a first flat clamping surface facing said second clamping yoke and being arranged closer to the second clamping yoke than said first clamping surfaces are when said supplementary jaw is inserted in said first clamping yoke.

14. A clamping device as defined in claim 13 further comprising a parallel guiding element for limiting a relative movement of said clamping yokes to one direction.

15. A clamping device as defined in claim 14 wherein said parallel guiding element is a guide bar that is introducible into a respective guide bore in each clamping yoke.

16. A clamping device as defined in claim 14 further comprising a center jaw having double sided flat clamping surfaces mounted between said clamping yokes for free guided displacement on two parallel guiding elements.

17. A clamping device as defined in claim 13 further comprising means for holding said spindle on said first clamping yoke for rotation about a longitudinal spindle axis, while maintaining the spindle immovable in its axial direction.

18. A clamping device as defined in claim 17 wherein said second clamping yoke is held on a spindle nut of said spindle.

19. A clamping device as defined in claim 13 wherein said first clamping yoke is fixedly connected to a main body.

20. A clamping device as defined in claim 19 wherein said first clamping yoke is held on an arm extending from said main body.

21. A clamping device as defined in claim 20 wherein said arm extends between said clamping yokes sidewardly from said spindle in one direction only.

22. A clamping device as defined in claim 19 wherein said main body comprises a slide plate for said second clamping yoke.

23. A clamping device comprising:

a first and a second clamping yoke adjustable relative to each other in a plane of motion;

said first clamping yoke carrying two main jaws each having a first angle clamping surface standing perpendicularly to said plane of motion, said first angle clamping surfaces together forming a first prismatic workpiece receiving means that is open towards said second clamping yoke and enclosing an angle of $\alpha_1 < 180$ degrees;
- a spindle extending parallel to said plane of motion for adjusting said clamping yokes relative to each other; and
- a supplementary jaw adapted for insertion ion said first clamping yoke, said supplementary jaw having a first flat clamping surface facing said second clamping yoke and being arranged closer to the second clamping yoke than said first clamping surfaces are when said supplementary jaw is inserted in said first clamping yoke;
- wherein said second clamping yoke is held on said spindle for pivotal motion about an axis perpendicular to said plane of motion.

24. A clamping device comprising:
- a first and a second clamping yoke adjustable relative to each other in a plane of motion, at least said first clamping yoke being fixedly connected to a main body;
- said first clamping yoke carrying two main jaws each having a first angle clamping surface standing perpendicularly to said plane of motion, said first angle clamping surfaces together forming a first prismatic workpiece receiving means enclosing an angle of $\alpha_1 < 180$ degrees that is open towards said second clamping yoke;
- a spindle extending parallel to said plane of motion for adjusting said clamping yokes relative to each other;
- a supplementary jaw adapted for insertion in said first clamping yoke, said supplementary jaw having a first flat clamping surface thereof facing said second clamping yoke and extending beyond said first prismatic workpiece receiving means toward said second clamping yoke;
- said main body including a plurality of compartments; and
- said main body having a box shaped design in a region of attachment to a workbench.

25. A clamping device as defined in claim 24 wherein a drawer is provided in said main body.

26. A clamping device as defined in claim 25 wherein said drawer is a collecting dish that is positionable in a region between and below said clamping yokes.

27. A clamping device comprising:
- a first and a second clamping yoke adjustable relative to each other in a plane of motion,
- said first clamping yoke carrying two main jaws each having a first angle clamping surface standing perpendicularly to said plane of motion, said first angle clamping surfaces together forming a first prismatic workpiece receiving means enclosing an angle of $\alpha_1 < 180$ degrees that is open towards said second clamping yoke;
- a spindle extending parallel to said plane of motion for adjusting said clamping yokes relative to each other; and
- a supplementary jaw adapted for insertion in said first clamping yoke, said supplementary jaw having a first flat clamping surface facing said second clamping yoke and being arranged closer to the second clamping yoke than said first clamping surfaces are when the supplementary jaw is inserted in said first clamping yoke;
- a main body supporting said clamping yokes; and
- said main body comprising an anvil.

28. A clamping device in accordance with claim 27 wherein said main body comprises means for attaching supplementary apparatus thereto.

29. A clamping device as defined in claim 28 wherein said attaching means comprise recesses in said main body.

30. A clamping device as defined in claim 28 further comprising:
- a saw guide adapted for attachment to said main body by said attaching means.

31. A clamping device as defined in claim 30 wherein said saw guide comprises a vertical guide adapted to extend perpendicularly to said plane of motion.

32. A clamping device as defined in claim 31 wherein said saw guide further comprises a horizontal guide means coupled to said vertical guide, for guiding a saw in a sawing direction.

33. A clamping device as defined in claim 27 wherein said anvil comprises edges for bending or beading.

34. Clamping device as defined in claim 19, characterized in that said main body comprises a guide means for an end piece of said spindle facing away from said first clamping yoke.

35. Clamping device as defined in claim 34, characterized in that said guide means is formed by a guide slot in a guide body surrounded by said main body, and said end piece extends into said guide slot.

36. Clamping device as defined in claim 34, characterized in that said guide secures said spindle against movement away from said slide plate.

37. Clamping device as defined in claim 27, characterized in that said guide means permits pivotal motion of said spindle.

38. Clamping device as defined in claim 27, characterized in that said main body comprises anvils arranged on opposite sides thereof.

* * * * *